United States Patent [19]
Von Koch

[11] 3,836,832
[45] Sept. 17, 1974

[54] RAPID-STOPPING SYSTEM FOR TRANSMISSIONS

[75] Inventor: Arwed Von Koch, Stuttgart, Germany

[73] Assignee: Daimler-Benz Aktiengesellschaft, Stuttgart-Unterturkheim, Germany

[22] Filed: Mar. 6, 1972

[21] Appl. No.: 232,176

[30] Foreign Application Priority Data
Mar. 8, 1971 Germany............................ 2110897

[52] U.S. Cl. ............................................... 318/265
[51] Int. Cl. .............................................. H02p 3/12
[58] Field of Search ........... 318/375, 379, 265, 266; 310/156

[56] References Cited
UNITED STATES PATENTS
2,307,514  1/1943  King................................... 318/265
2,610,518  9/1952  Goedeke et al.................. 318/265 X
2,925,076  2/1960  Jensen et al. .................... 318/265 X
3,265,950  8/1966  Modiano.......................... 318/375 X
3,390,289  6/1968  Dijken et al. .................... 310/156 X Primary Examiner—Robert K. Schaefer
Assistant Examiner—W. E. Duncanson, Jr.
Attorney, Agent, or Firm—Craig & Antonelli

[57] ABSTRACT

A rapid stopping installation for an electric range selector mechanism in an automatic transmission which includes a selector lever to be displaced into a position determined by a pre-selector; a permanent magnet motor is used for the drive of the pre-selector whereby the deenergization of the motor, when reaching the pre-selected lever position, is coupled with an immediate short-circuiting of the supply terminals of the motor to brake the same.

6 Claims, 1 Drawing Figure

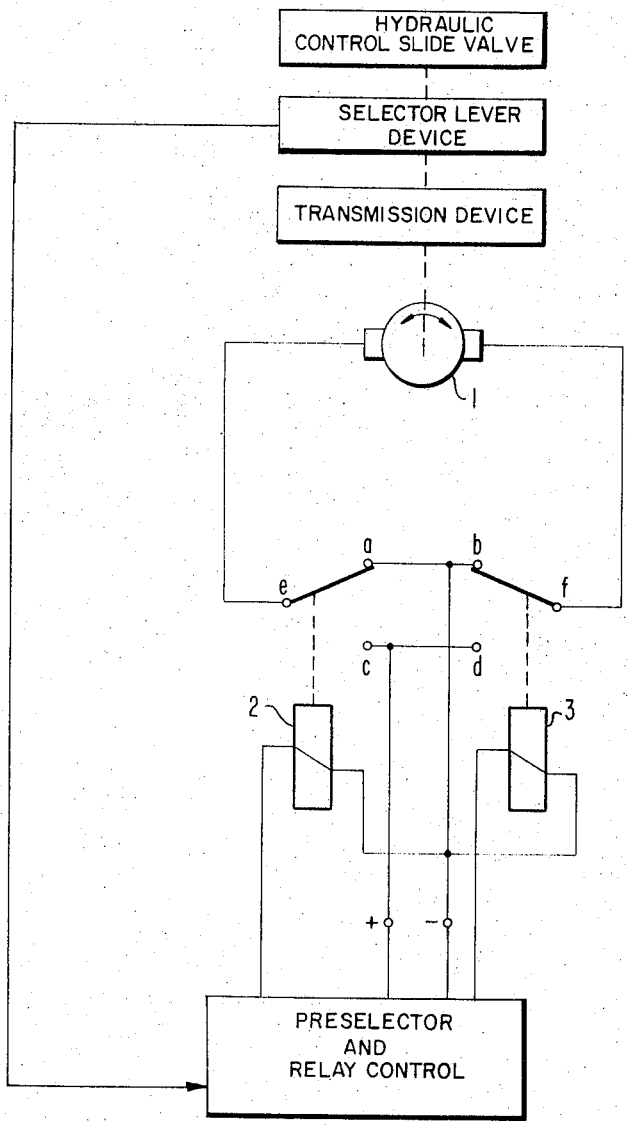

RAPID-STOPPING SYSTEM FOR TRANSMISSIONS

The present invention relates to a rapid stopping installation for an electric range selector mechanism in an automatic transmission with a selector lever to be displaced into the position adjusted by a pre-selector switch or the like.

Different possibilities are known in the art for the actuation of an automatic transmission of motor vehicles.

According to one known arrangement a selector lever at the transmission is actuated by a shifting lever or shifting stick by way of a linkage in a mechanical manner. In addition to this purely mechanical transmission, an electric transmission is known in which the selector lever in the transmission is displaced by an electric motor into the desired position which is adapted to be selected on a pre-selector switch. A difficulty resides in connection therewith to maintain the desired position of the selector lever at the transmission with sufficient accuracy. For that purpose it is absolutely necessary that the motor which displaces the selector lever into the desired position, comes to a standstill as rapidly as possible after the de-energization.

In order to bring the driving motor of the selector lever as rapidly as possible to a stop after the de-energization, in order to avoid in this manner an overrunning of the selector lever, it is known in the prior art to utilize mechanical braking mechanisms which are released upon energization of the motor and become effective during the de-energization thereof.

Furthermore, it is known in the art to brake the rotor of the driving motor continuously so that during the operation the braking moment has to be additionally overcome by the motor. When the motor is turned off, the braking becomes effective thereby more rapidly.

However, the prior art arrangements entail the disadvantage that a mechanism is necessary that is relatively costly from an apparatus point of view, and which is additionally subjected strongly to wear. Furthermore, with the continuous braking of the driving motor an uneconomical overdimensioning of the entire installation is necessary.

Moreover, the servicing expenditures for the mechanical braking mechanism is considerable, and both the susceptibility to breakdown as also the relatively short length of life become effective in a disadvantaged manner.

The aim of the present invention resides in providing a rapid stoppage installation of the aforementioned type which is particularly simple in its construction and is very reliable and accurate in its operation.

As solution to the underlying problem, the present invention provides that a permanent magnet motor is used as drive means for the selector lever and that the turning-off of the motor after reaching the pre-selected selector lever position is coupled with the immediate short circuiting of its motor supply terminals.

An advantageous further development of the installation according to the present invention is characterized in that an oxide magnet motor is used.

According to a preferred embodiment of the installation according to the present invention, provision is made that the de-energization of the motor takes place by way of a relay.

Preferably the installation according to the present invention is so constructed that the relay simultaneously is used as shifting relay for the reversal of the direction of rotation of the motor.

Preferably the arrangement is made in such a manner that a hydraulic control slide valve of any conventional construction is actuated by way of the selector lever.

Provision is made advantageously that a relatively high transmission ratio is provided between the rotating shaft of the motor and the control slide valve.

The considerable technical progress attainable according to the present invention resides above all in that practically any auxiliary mechanism can be dispensed with since the particularly rapid braking of the motor provided according to the present invention is attained by measures involving purely circuitry aspects.

With an arrangement according to the present invention, the failure occurrences, the space requirements, the servicing expenditures and all disadvantages connected in principle with an auxiliary installation are eliminated by the present invention.

Accordingly, it is an object of the present invention to provide a rapid stoppage installation for transmissions which avoids the aforementioned shortcomings and drawbacks encountered in the prior art.

Another object of the present invention resides in a rapid stopping installation for automatic transmissions which eliminates the need for any auxiliary apparatus to assure rapid stoppage of the electric driving motor driving the transmission selector lever.

A further object of the present invention resides in a rapid stopping installation for transmissions which avoids effectively and reliably an overrunning of the driving motor, and which assures an accurate adjustment of the selector lever to its desired position.

Still a further object of the present invention resides in a rapid stopping installation for transmissions which requires relatively little space, minimizes wear and therewith failures and breakdowns and is relatively inexpensive in original cost and installation.

These and further objects, features and advantages of the present invention will become more apparent from the following description when taken in connection with the accompanying drawing which shows, for purposes of illustration only, one embodiment in accordance with the present invention, and wherein:

The single FIGURE is a circuit diagram of the electric control circuit provided in accordance with the present invention.

In the schematically illustrated embodiment the permanent magnet motor 1 of any conventional construction and which is an oxide magnet motor is selectively controlled in its energization by one of the two relays 2 or 3 via the pre-selector and relay control device 4 whereby one of the two relays is energized for one direction of rotation while the other opposite direction of rotation is realized by energization of the other relay.

It is assumed that, for example, for the rotation of the permanent magnet motor 1 in the counterclockwise direction, the relay 2 is energized and thereby establishes an electric contact between the points c and e so that the motor is connected with the power supply voltage in the manner illustrated. As soon as the selector lever 5 in the transmission has reached the predetermined position, a signal is fed back by way of a measuring sensing or feeler device of conventional construction (not shown) in the transmission to the relay control device 4 which causes the relay 2 to drop again, i.e., to become de-energized. As a result thereof, the connection between points a and e is re-established so that with the still existing connection between points b and f the permanent magnet motor 1 is short circuited, and therewith the braking effect in accordance with the present invention is initiated in an effective manner. For the rotation of the permanent motor in the clockwise direction, in contradistinction thereto, provision is made that the relay 3 is energized so that the electric connection between the points d and f is established and the permanent magnet motor 1 is thereby connected with the power supply voltage with a reverse polarity. As soon as the pre-selected position of the selector lever in the transmission is attained, the connection between the points b and f is re-established in a corresponding manner as already described in connection with the counterclockwise rotation, upon de-energization of the relay 3 and therewith the desired braking of the short-circuit permanent magnet motor 1 is also initiated again.

When turning off (deenergizing) the permanent magnet motor 1, the latter still carries out up to three rotations which, however, in view of the high transmission ratio provided by the transmission device 6 between the motor and the selector lever is practically negligible. The required adjusting accuracy of the control edges of the hydraulic control slide valve 7 driven by the motor amounts to about ± 1 mm. These permissive tolerances can be maintained with certainty by means of the braking in accordance with the present invention.

A further advantage of the circuit according to the present invention consists in that also when both relays 2 and 3 are intentionally energized or are energized due to an erroneous shifting, the brake circuit remains preserved. This is so as the permanent magnet motor 1 remains short-circuited when both relays 2 and 3 are energized to establish a connection between points e and c and between points d and f. Thus, the circuit in accordance with the present invention additionally includes a safety feature against erroneous switching.

Since the various components of the system according to the present invention are of conventional construction and are commercially available, a detailed description thereof is dispensed with herein for the sake of brevity.

However, while I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A rapid-stopping installation for an electric range selector mechanism in an automatic transmission having a selector lever to be displaced into a position adjusted at a pre-selector means, characterized in that a permanent magnet motor means is drivingly connected with the selector lever, said motor means being an oxide magnet motor and having supply terminals for connection with a power supply voltage, and in that de-energization of the oxide magnet motor upon reaching the pre-selected selector lever position is coupled with control circuit means for immediately short-circuiting its supply terminals, said control circuit means controlling the energization and de-energization of said motor and including two relay means being operable as shifting relays for the reversal of the direction of rotation of said motor, said two relay means each having a movable contact member adapted to connect a first fixed contact point selectively with one of two other contact points, one of the two other contact points of each relay means corresponding to the same condition of energization of the respective relay means being connected with each other and with one supply terminal while the other of the two contact points of each of the two relay means are connected to the other supply terminal, said fixed contact points being connected with the armature of the motor means so that in the de-energized condition of the two relay means the armature is short-circuited to effect braking of said motor, said two relay means being arranged for simultaneous de-energization and energization so that in both the de-energized and energized conditions of said two relay means, the armature is short-circuited to effect braking of said motor.

2. An installation according to claim 1, characterized in that a hydraulic control slide valve means is actuated by way of the selector lever.

3. An installation according to claim 2, characterized in that a transmission means with a relatively large transmission ratio is provided between the rotating shaft of the motor and the control slide valve means so that rotation of the motor during braking does not adversely affect the position of the control slide valve means.

4. An installation comprising an automatic transmission, a selector lever for controlling the automatic transmission in accordance with the position thereof, preselector means for preselecting a desired position for the selector lever, permanent magnet motor means drivingly connected with the selector lever, said motor means being an oxide magnet motor having supply terminals for connection with a power supply voltage and being energized for controlling the positioning of the selector lever in accordance with the preselected selector lever position, the de-energization of the motor upon reaching the preselected selector lever position being coupled with control circuit means for immediately short-circuiting the supply terminals of said motor means, said control circuit means controlling the energization and de-energization of said motor and including two relay means being operable as shifting relays for the reversal of the direction of rotation of said motor, means for energizing and de-energizing said two relay means individually or together, said two relay means each having a movable contact member adapted to connect a first fixed contact point selectively with one of two other contact points, one of the two other contact points of each relay means corresponding to the same condition of energization of the respective relay means being connected with each other and with one supply terminal while the other of the two contact points of each of the two relay means are connected to the other supply terminal, said fixed contact points being connected with the armature of the motor means so that in both the de-energized and energized conditions of the two relay means the armature is short-circuited to effect braking of said motor.

5. An installation according to claim 4, further comprising a control means actuated by the selector lever.

6. An installation according to claim 5, wherein said control means is a hydraulic control slide valve means.

* * * * *